(12) United States Patent
Brandstaetter et al.

(10) Patent No.: US 9,325,352 B2
(45) Date of Patent: Apr. 26, 2016

(54) CONTROL ARCHITECTURES FOR RF TRANSCEIVERS

(75) Inventors: Siegfried Brandstaetter, Linz (AT); Burkhard Neurauter, Linz (AT); Mario Huemer, Alkoven (AT); Werner Hein, Neubiberg (DE); Wandad Sadat-Guscheh, Linz (AT); Manuel Jung, Traun (AT); Gunther Kraut, Egmating (DE); Thomas Puehringer, Pfarrkirchen (AT); Friedrich Seebacher, Wartberg ob der Aist (AT); Andreas Voggeneder, Schwerthberg (AT); Michael Wekerle, St. Martin (AT); Dietmar Wenzel, Munich (DE)

(73) Assignee: Intel Deutschland GmbH, Neubiberg (DE)

( * ) Notice: Subject to any disclaimer, the term of this patent is extended or adjusted under 35 U.S.C. 154(b) by 692 days.

(21) Appl. No.: 12/650,472

(22) Filed: Dec. 30, 2009

(65) Prior Publication Data

US 2011/0161534 A1 Jun. 30, 2011

(51) Int. Cl.
*H04B 1/00* (2006.01)
*H04B 1/38* (2015.01)
*G06F 3/00* (2006.01)

(52) U.S. Cl.
CPC ............... *H04B 1/0003* (2013.01); *G06F 3/00* (2013.01); *H04B 1/38* (2013.01)

(58) Field of Classification Search
CPC ........... G06F 9/00; G06F 3/00; H04B 1/0003; H04B 1/38
USPC ........................................................ 455/77
See application file for complete search history.

(56) References Cited

U.S. PATENT DOCUMENTS

| 7,248,848 | B2 * | 7/2007 | Matthews et al. | 455/296 |
| 8,074,051 | B2 * | 12/2011 | Hokenek et al. | 712/7 |
| 8,190,102 | B2 * | 5/2012 | Rofougaran | 455/77 |
| 2011/0035522 | A1 * | 2/2011 | Tan et al. | 710/107 |

OTHER PUBLICATIONS

Stasaewski et al., "Software Assisted Digital RF Processor for Single-Chip GSM Radio in 90 nm CMOS", IEEE, 2006.*
Iancu et al., "Software Implementation of WiMAX of the Sandbridge SandBlaster Platform", Springer, 2006.*
Borowik et al., "Cost-Efficient Synthesis for Sequential Circuits Implemented Using Embedded Memory Blocks of FPGA's", 2007 IEEE Design and Diagnostics of Electronic Circuits and Systems, Apr. 2007, pp. 1-6.

(Continued)

*Primary Examiner* — Benjamin Geib
(74) *Attorney, Agent, or Firm* — Schwegman Lundberg & Woessner, P.A.

(57) ABSTRACT

Described herein are devices and methods for implementing a transceiver with independently controlled components. The components may include a programmable digital portion, a dedicated digital portion, and an analog portion. Each independently controlled component includes a programmable controller that resides in the programmable digital portion of the component that controls components in the dedicated digital or analog portions using state transition information. The programmable controller is configured to accommodate a broad spectrum of state transition information and is capable of emulating a plurality of hardwired finite state machines

13 Claims, 10 Drawing Sheets

(56) References Cited

OTHER PUBLICATIONS

Buchenrieder et al., "FPGA-based parallel ASIP architecture for reactive systems", Electronics Letters, vol. 33, No. 10, May 8, 1997, pp. 842-843.

Pyttel et al., "PSCP: A Scalable Parallel ASIP Architecture for Reactive Systems", Proceedings of the Design Automation and Test Europe Conference, Paris, France, Feb. 23-26, 1998, pp. 370-376.

* cited by examiner

CONTROL ARCHITECTURES FOR RF TRANSCEIVERS

BACKGROUND

RF transceivers are implemented in a wide variety of wireless devices, including mobile phones, laptops, and other hand-held devices that benefit from receiving or sending information over a wireless network. In general, the sophistication of wireless devices has evolved over time and will continue to increase well into the future as the bandwidth capability of wireless networks increases.

RF transceivers are generally used by wireless devices to send and receive communication and are configured to include components designed to transmit or receive wireless signals. Typically, the transmitter and receiver components are controlled by hard-wired logic circuits that are designed using an iterative design process that requires numerous integrated circuit "tape-outs" of RF transceiver circuits, which is costly and time consuming. Generally, the hard-wired logic circuits are designed for a specific function which limits their flexibility, reconfigurability, and their reusability. For example, finite state machines are typically constructed using hard-wired logic circuits. Finite state machines are used to control systems or devices that are limited to a finite amount of states of operation. Since the possible amount of operational states are limited or known, hard-wired logic circuits may be modeled to operate the system or device within the finite state framework.

BRIEF DESCRIPTION OF THE DRAWINGS

The detailed description is described with reference to the accompanying figures. The use of the same reference numbers in different instances in the description and the figures may indicate similar or identical items.

DETAILED DESCRIPTION

Figure 1:
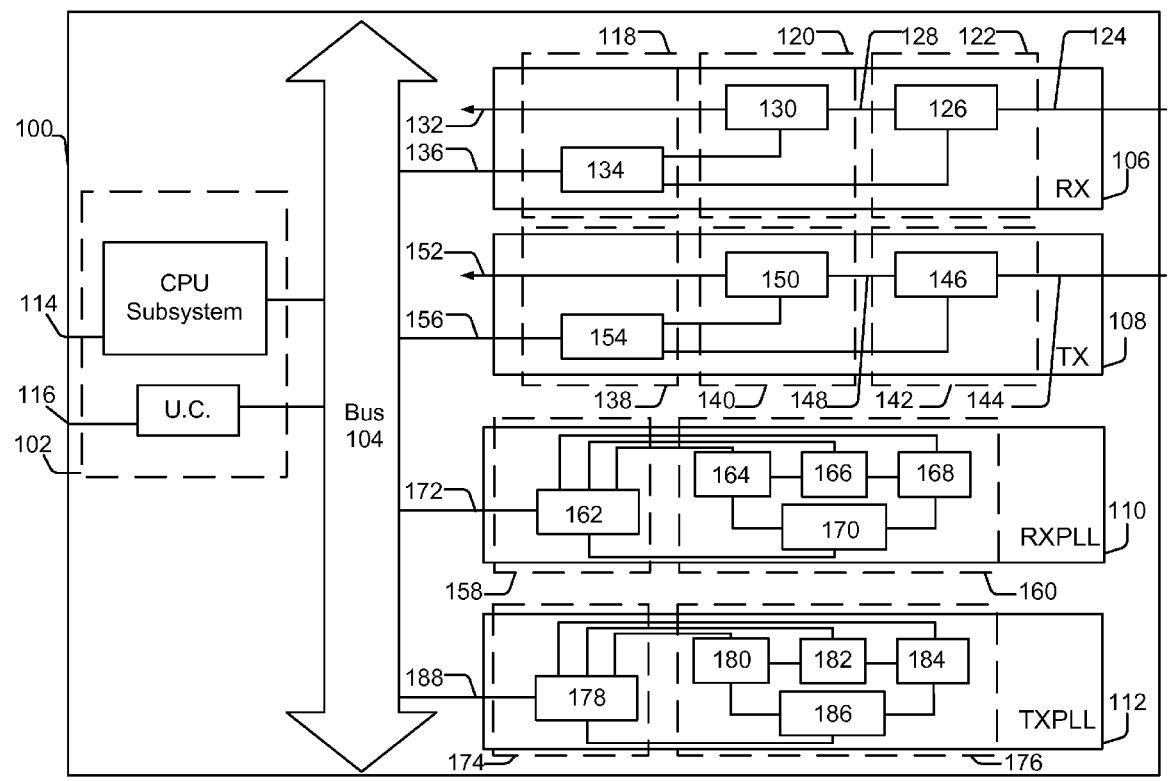
FIG. 1 is an exemplary embodiment of a transceiver in accordance with an implementation of the disclosure.

Disclosed herein are techniques and control architectures to independently control analog and digital modules of transceivers using programmable uniform building blocks. In general, techniques in accordance with the present disclosure may advantageously reduce the amount of integrated circuit tape-outs, or circuit redesigns, resulting in a faster time to market and lower development costs for new transceiver designs. Further, the control architectures result in improved flexibility and reusability of the transceiver due to their programmable nature.

In general, an implementation of a transceiver in accordance with the present disclosure may include independently controllable components such as a receiver, a transmitter, a receiver Phase-lock loop component, and a transmitter Phase-lock loop component. The transceiver and each of the independently controlled components include an analog portion, a dedicated digital portion, and a programmable digital portion. The programmable digital portion may include independently controlled components that control components in the dedicated digital portion and/or the analog portion of the transceiver. Each independently controlled component may include a programmable unit controller that is configured to receive and execute state transition information that is used to control the analog and digital modules used in the transceiver. Each unit controller may include a programmable processor component configured to receive and execute the state transition information in order to control the analog and digital modules. Further, each programmable processor component may be configurable to accommodate a broad spectrum of state transition information that is used to control the transceiver. The programmable processor may be capable of reconfiguration for each clock cycle. The programmable processor will be discussed in greater detail below.

The programmable processing component may also include a multi-stage pipeline processor to process the state transition information. Each independently controlled component may be capable of generating a plurality of threads, or executable instructions related to the state transition information, to be processed by the multi-state pipeline processor. The multi-stage pipeline may be configured to accommodate multiple threads within the pipeline at any given time. Each of the threads may be processed in a fixed order, such that a thread may be processed through each stage during each clock cycle. The multi-stage pipeline processor may be configured to process different threads simultaneously in different stages during each clock cycle.

Another implementation in accordance with the present disclosure relates to a design method for a transceiver that uses a programmable processing component to develop the control functions for the components of the transceiver. Once the control functions for the transceiver have been developed, the programmable processor component may be replaced with a non-programmable logic component. Using the programmable processing component to develop the control functions of the transceiver reduces the amount of tape-outs to develop the transceiver design and operation, resulting in lower development costs and faster time to market for new transceiver designs.

Techniques for controlling the components within a transceiver in accordance with the present disclosure may be implemented in a number of ways. Exemplary environment and context are provided below with reference to the included figures and the on going discussion.

Exemplary Systems And Devices

FIG. 1 illustrates a portion of an exemplary transceiver 100 in which techniques in accordance with the present disclosure may be implemented. In this implementation, the transceiver 100 includes a control and interface component 102, a bus and distribution system 104, a receiver 106, a transmitter 108, a receiver phase-lock loop (PLL) component 110, and a transmitter PLL component 112. Additionally, the transceiver 100 may include more than one receiver 106 or transmitter 108 which are not shown in FIG. 1 for the sake of simplicity.

In one embodiment, the receiver 106, the transmitter 108, the receiver PLL component 110, the transmitter PLL component 112 and a control and interface component 102 are configured to be independently controlled by their respective unit controllers 116, 134, 154, 162, and 178. The unit controllers may be configured to be configurable via configuration information provided from the control and interface component 102. Specifically, the central processing unit (CPU) sub-system 114 may be configured to provide configuration information to the unit controller 116, the receiver 106, the transmitter 108, the receiver PLL 110, and the transmitter PLL 112 over the bus and distribution system 104. The configuration information enables each component to be configurable to perform various tasks that enable the transceiver 100 to receive and transmit wireless signals and perform other functions. For example, the unit controller 116 may be configured to control the control and interface component 102 when switching from 2G to 3G interface bandwidth operations. Another unit controller may be configured to set the digital front end (DFE) parameters, startup the DFE, perform periodic automatic gain control, and perform periodic power changes.

The receiver 106 includes a programmable digital portion 118, a dedicated digital portion 120, and an analog portion 122. The programmable digital portion 118 may include a unit controller 134, the dedicated digital portion 120 may include a digital front end (DFE) 130. The analog portion 122 may include an analog front end (AFE) 126 that is configured to receive an incoming signal 124. As noted above, the unit controller 134 may be configured to receive the configuration information from the control and interface component 102 or the CPU sub-system 114 via the bus and distribution system 104 and path 136. In one embodiment, the unit controller 134 may utilize the configuration information to control a programmable logic architecture that controls the DFE 130 and the AFE 126. The unit controller may control the filter characteristics, gain, and power of the AFE 126 and set the Finite Impulse Response coefficients and digital gain for the DFE 130. The programmable logic architecture will be described in more detail below.

The analog portion 122 includes an analog front end (AFE) 126 configured to receive and condition an incoming signal, via path 124, for digital processing. The AFE provides the incoming signal along a path 128, which may include a digital-to-analog (DAC) converter (not shown), to a digital front end (DFE) 130 that resides in the dedicated digital portion 120. The AFE may convert the incoming signal 124 to a digital signal prior to being sent to the DFE 130. Alternatively, the DFE 130 may digitize the incoming signal 124. The DFE 130 digitally processes the incoming signal 124 and provides the incoming signal 124 directly to the control and interface component 102 via path 132. Please note that individual communication lines, such as 132 and 136, may represent a plurality of lines but may be are shown here as a single line for ease of illustration. Also, the large arrow symbol used to illustrate bus and distribution system 104 may also include more than one communication line, but is shown here as a single line for ease of illustration.

Similarly, the unit controller 154 may be included in the programmable digital portion 138 in the transmitter 108. The unit controller 154 may be configured to receive configuration information from the control and interface component 102 or the CPU sub-system 114 via the bus and distribution system 104 and via path 156. In one embodiment, the transmitter 108 may be configured to receive an outgoing digital signal along path 152 that is provided to DFE 150 that conditions the outgoing signal for transmission. The outgoing digital signal is converted to an analog signal along path 148, or alternatively the AFE 146 converts the digital signal to an analog signal when it is received. The AFE conditions the analog output signal 144 to prepare it for transmission by the transceiver 100.

As further shown in FIG. 1, the transceiver 100 may also include a receiver PLL 110 that has a programmable digital portion 158 and an analog portion 160. In one embodiment, the programmable digital portion 158 may include a unit controller 162 that controls various analog components in the analog portion 160. The unit controller 162 may be configured to receive configuration information from the control and interface component 102 or the CPU sub-system 114 via the bus and distribution system 104 and path 172. The configuration information may be utilized by the unit controller 162 to a control a programmable logic architecture in order to control various analog components in the receiver PLL 110, such as a phase detector (PFD) 164, a loop filter (LF) 166, a voltage controlled oscillator (VCO) 168, and a divider 170.

The transceiver 100 may also include a transmitter PLL 112 that has a programmable digital portion 174 and an analog portion 176. In one embodiment, the programmable digital portion 174 may include a unit controller that controls various analog components in the analog portion 176. The unit controller 178 may be configured to receive configuration information from the control and interface component 102 or the CPU sub-system 114 via the bus and distribution system 104 and path 188. The configuration information may be utilized by the unit controller 178 to control a programmable logic architecture in order to control various analog components in the transmitter PLL 112, such as a phase detector 180, an loop filter 182, a VCO 184, and a divider 186.

Figure 2:
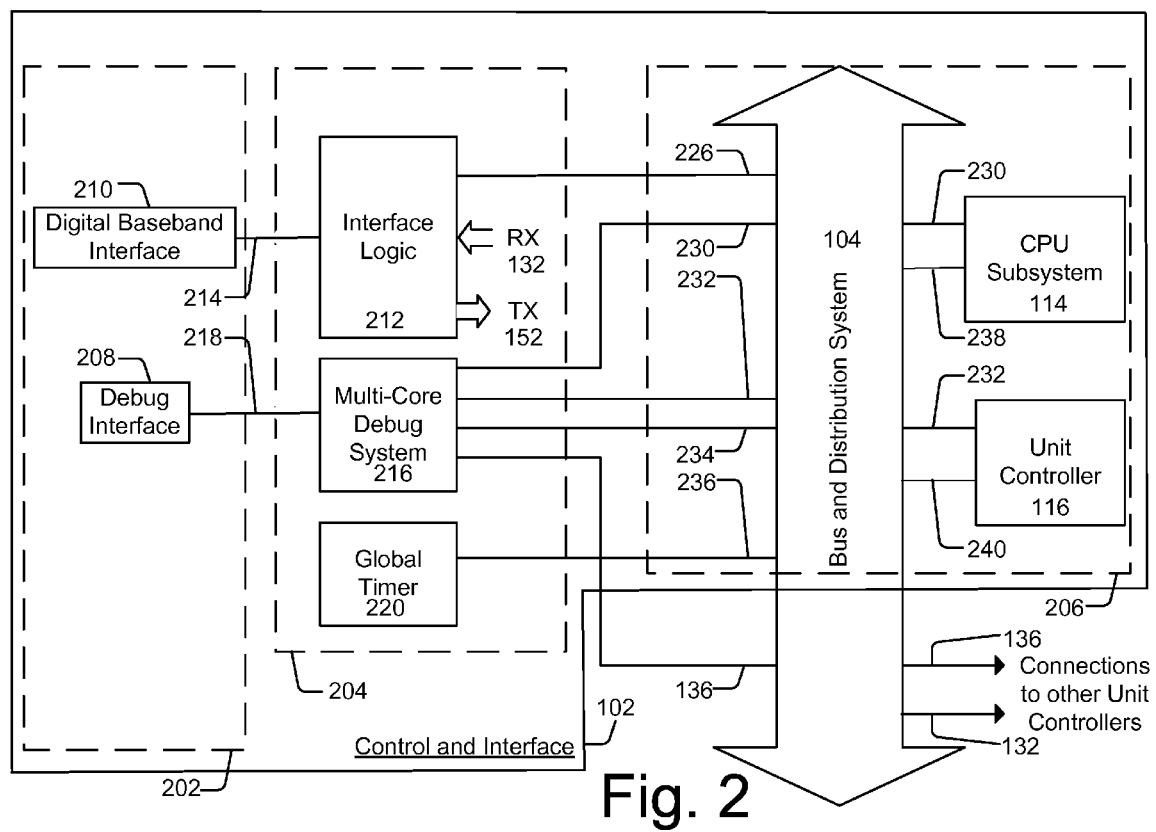
FIG. 2 is an exemplary embodiment of a control and interface component embodied in a transceiver in accordance with an implementation of the disclosure.

FIG. 2 illustrates additional features for the embodiment of the control and interface component 102 that includes an analog portion 202, a dedicated digital portion 204, and a programmable digital portion 206. The analog portion 202 may be configured to act as the baseband interface for the transceiver 100 via the digital baseband interface 210. The digital baseband interface 210 may also be configured to receive configuration macros that are provided to the CPU sub-system 114, which decodes the configuration macros to generate the configuration information that may be used by unit controllers 116, 134 and the like. The configuration macros may be provided along path 214 to the interface logic 212, which provides configuration macros to CPU sub-system 114 via paths 226, 104, and 238. The analog portion 202 may also include a debug interface 208 configured to receive debugging instructions and to provide them to the Multi-Core Debug System 216 via path 218.

In one embodiment, the dedicated digital portion 204 of FIG. 2 may be configured to include the interface logic 212, the Multi-Core Debug System 216, and the global timer 220. The interface logic 212 may be configured to act as a master of the main bus system 300 (shown in FIG. 3) in addition to writing the received configuration macros to the CPU sub-system 114. The interface logic 212 is also responsible for decoding timing accurate strobe macros and for distributing various control signals, to be described in greater detail below, to the CPU sub-system 114 and all the unit controllers in the transceiver 100. The unit controller 116 is also capable of communicating with the logic interface 212 and the CPU sub-system 114 via paths 226, 104, and 240. The interface logic 212 and the CPU sub-system 114 may also be configured to receive signals from other unit controllers via path 132. Path 132 is provided as an example path for ease of illustration. It should be noted that a plurality of paths similar to path 132 may be implemented to enable the interface logic 212 and the CPU sub-system 114 to communicate with other unit controllers in the transceiver 100. For example, the interface logic communicates data to the receiver 106 along path 132 and transmitter 108 along path 152 as shown in FIG. 1.

As further shown in dedicated digital portion 204 of FIG. 2, the Multi-Core Debug System 216 may be configured to analyze the transceiver 100 for faulty or undesired performance. The Multi-Core Debug System 216 may be configured to debug the CPU sub-system and all the unit controllers. Paths 136, 230, 232, 234 are exemplary communication paths that permit the debugging process to occur. It should be noted there may be more than one path, such as path 136, which may connect the Multi-Core Debug System 216 to a plurality of unit controllers residing in the transceiver 100. Only one path 136 is shown here for ease of illustration.

The dedicated digital portion may also include a global timer 220 that acts as a free running timer and that provides its current value via path 236 to the CPU sub-system 114 and all unit controllers in order to keep them synchronized.

Figure 3:
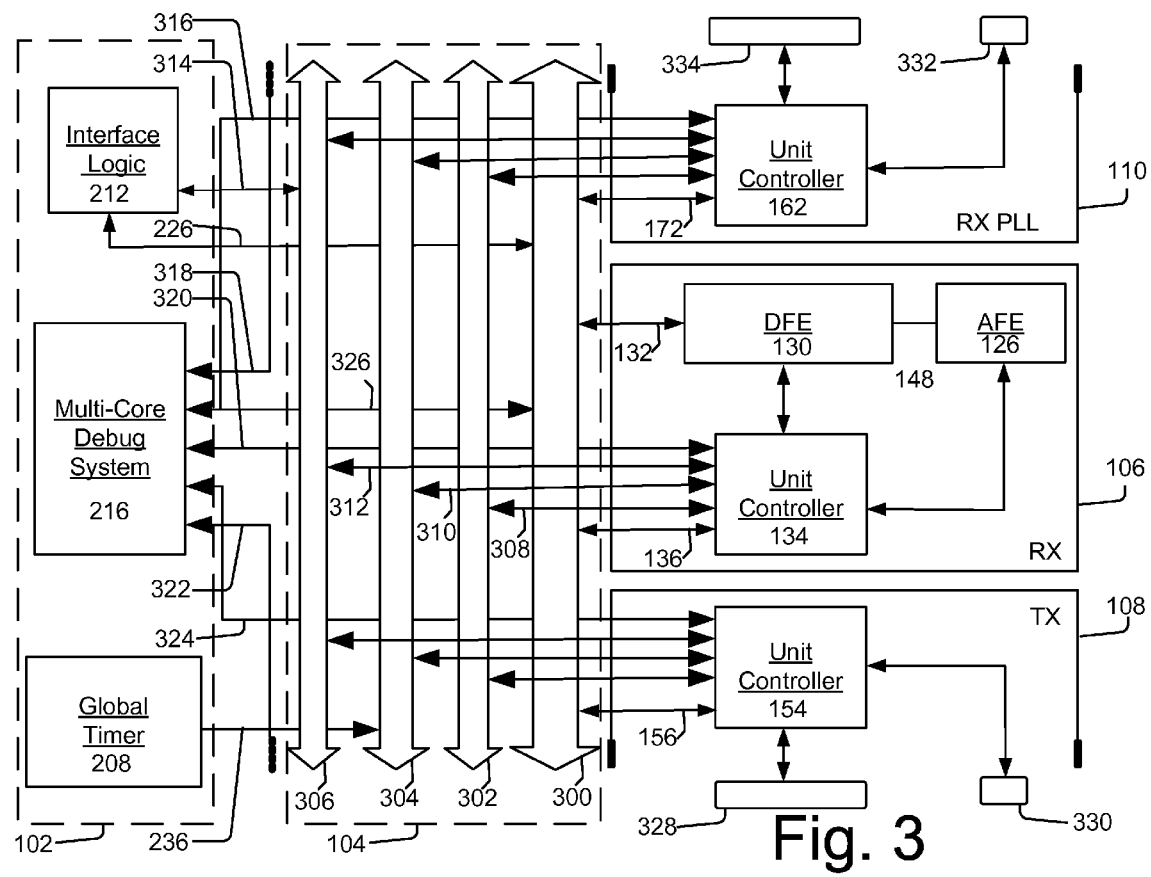
FIG. 3 is an exemplary embodiment of a transceiver in accordance with an implementation of the disclosure.

FIG. 3 illustrates another embodiment of the bus and distribution system 104 that includes a plurality of communication paths that are used to control and operate the components of the transceiver 100. The bus and distribution system 104 is shown here, in FIG. 3, along with the control and interface 102 and the receiver 106, transmitter 108, and the receiver PLL 110. For ease of illustration, the transmitter 108 and the receiver PLL 110 are not shown in their entirety; for example, components 328, 330, 332, and 334 are representative of various other components that may be connected to their respective unit controller, such components may include analog or digital components described in FIG. 1. To fully implement the distributed controlling concept, e.g. independently controlled transceiver components, a plurality of dedicated bus systems may be utilized to allow the independently controlled components to operate more efficiently than over a single bus. In one embodiment, the bus and distribution system 104 may include a main bus system 300, a signaling bus system 302, a global time distribution system 304, and a time accurate strobe distribution system 306.

The main bus system 300 may be configured to connect the interface logic 212 and the CPU sub-system 114 (not shown in FIG. 3) to the unit controllers residing in the transceiver 100 via paths 226 or 238 (not shown in FIG. 3). Although FIG. 3 only shows three unit controllers 134, 154, 162 the disclosure is not limited to the implementation shown. The main bus system 300 receives configuration information from the control and interface component 102 via path 226 and provides the configuration information to the CPU sub-system 114 (not shown in FIG. 3) which decodes the configuration information and provides the configuration information to each of the unit controllers, as shown here, but not limited to paths 136, 156, and 172. Alternatively, the configuration information may be provided directly to each of the unit controllers over paths 136, 156, and 172. The main bus system may also be configured to receive and provide control information between the unit controllers and the control and interface component 102, and the CPU sub-system 114.

The signaling bus system 302 may be configured to provide and receive event notifications to and from each of the unit controllers via path 308. Also, the CPU sub-system 114 (not shown in FIG. 3) is also connected to the signaling bus system 302. Other unit controllers, such as 154 and 162, may also be connected to the signaling bus system in a similar manner as illustrated by path 308. The event notifications may include time information, based on the global timer value, which indicates when tasks should be performed by individual unit controllers. The timing information may also include when the unit controller 134 sent the event notification to the signaling bus system 302 or includes an indication of when an event should occur at the receiving unit controller 162. For example, the transmitter 108 may provide an event notification to a system control unit (not shown) related to starting temperature measurement of a power amplifier (not shown). The transmitter receives a temperature value from the system control unit (not shown). Also, the transmitter provides an event notification to the system control unit (not shown) to set the gain of the power amplifier (not shown). The receiver 106 may provide an event notification to the system control unit (not shown) related to setting the gain of a low noise amplifier (not shown).

The global time distribution system 304 may be configured to provide the global timer value to the unit controllers (for example via path 310) and the CPU sub-system 114 (not shown). The global timer value enables the unit controller derive a local timer value and to synchronize its operations with other unit controllers, such as unit controllers 154 and 162, and the CPU sub-system 114. The global time distribution system 304 receives the global timer value from the global timer 208 via path 236.

The time accurate strobe distribution system 306 may be configured to provide a time accurate strobe signal to each of the unit controllers that directs the unit controllers to perform a certain task. The unit controllers are configured to be sensitive to certain time accurate strobe signals based on the configuration information they received from the CPU sub-system 114. For example, the time accurate strobe signal may be a command instruction such as "start receiving" or "start transmitting." The time accurate strobe signal may be provided by the interface logic 212 via path 314, which in turn is provided to a unit controller 134 via path 312. Only path 312 is discussed here for ease of explanation, but each unit controller may be connected in a similar manner to the time accurate strobe distribution system 306.

The Multi-Core Debug System 216 is connected via dedicated debug lines 316, 318, 320, 322, 324, and 326 that are connected to all unit controllers and the CPU sub-system. In FIG. 3, the debug bus system 316, 318, 320, 322, 324, and 326 includes connections to each unit controller shown via paths 316, 320, and 324 and to the main bus system 300 via path 326. Also, for exemplary purposes, paths 318 and 322 are shown connected to the Multi-Core Debug System 216 and are intended to show that additional unit controllers (not shown) may be connected to the Multi-Core Debug System 216.

Figure 4:
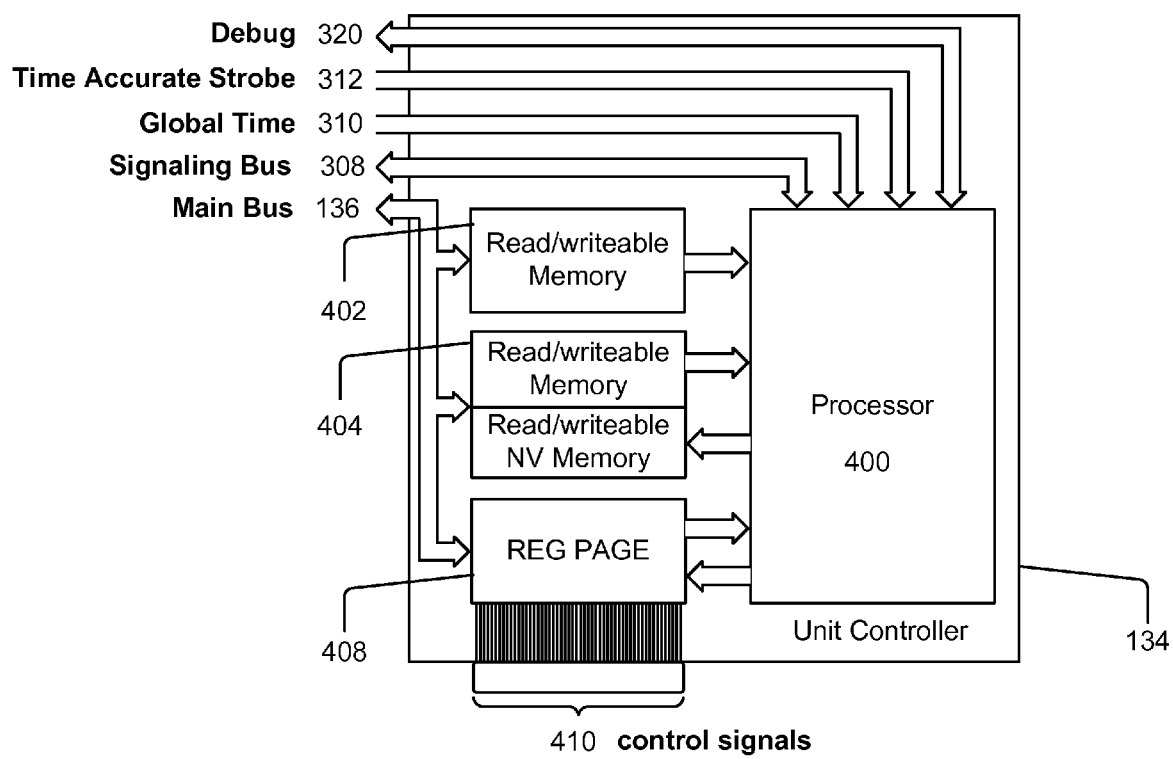
FIG. 4 is an exemplary embodiment of a unit controller in accordance with an implementation of the disclosure.

FIG. 4 illustrates one embodiment of a unit controller 134 that may include a processor component 400 that is configured to receive and execute state transition information loaded from read/writeable memory component 402. Read/writeable memory component 404 (e.g. RAM, EEPROM) is used to store data and configuration information for the processor component 400. A portion of the read/writeable memory component may also be configured to include non-volatile memory capability. The processor component 400 is configured to receive and execute state transition information or otherwise emulate hardware finite state machines (FSM). The processor component may also be connected to the debug distribution system 316, 318, 320, 322, 324, and 326, the time accurate strobe distribution system 312, the global time distribution system 310, and the signaling bus system 308. The processor component 400 is responsible for receiving or providing control signals 410 which may include the time accurate strobe signal 312, the global time signal 310, and other signals from the signaling bus 308. The process component 400 may be used to control the DFE 130 and AFE 128 components via register 408. For example, the unit controller 134 may directly control components in the dedicated digital portion 120 and the analog portion 122 of the receiver 106.

Figure 5:
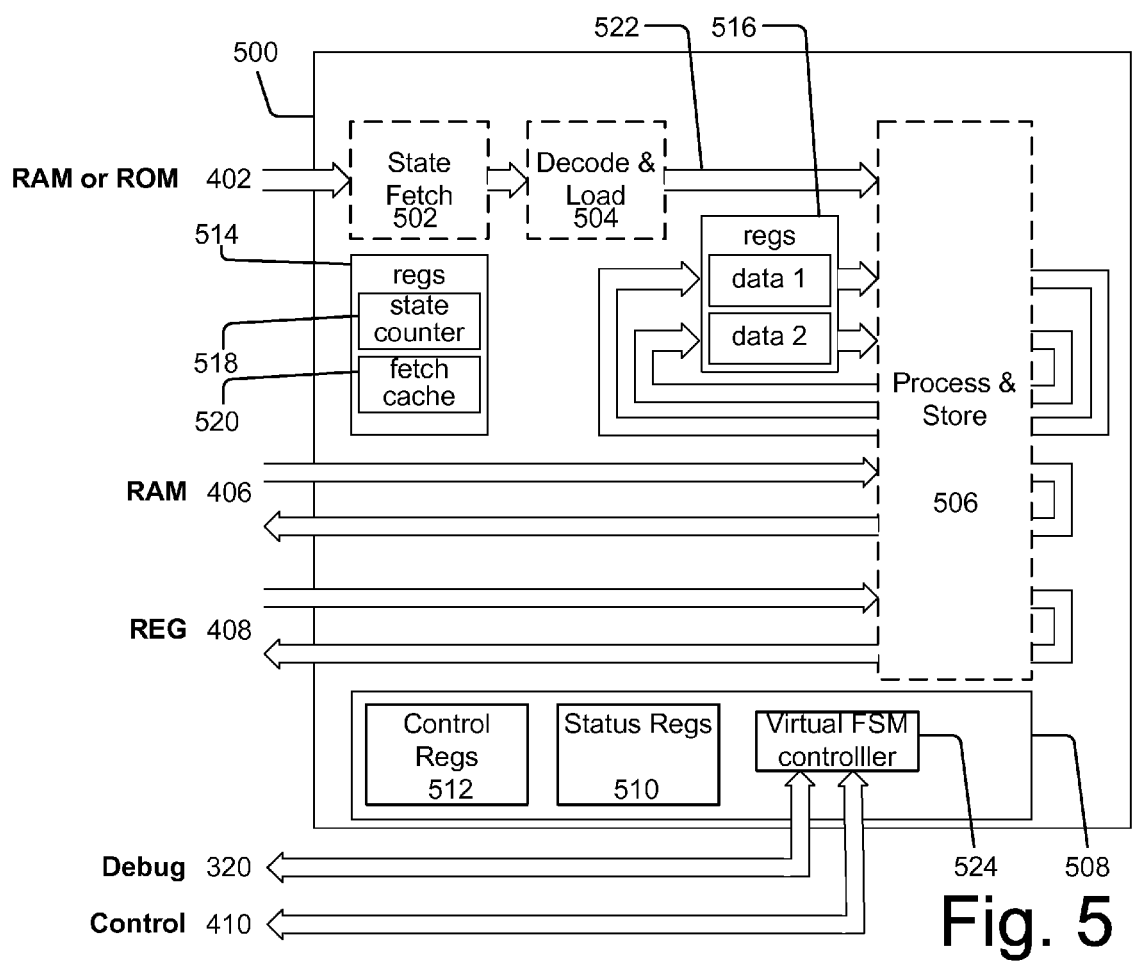
FIG. 5 is an exemplary embodiment of a processor in accordance with the present disclosure.

FIG. 5 illustrates an embodiment in which the processor component 400 may include a pipeline processor configuration that receives and executes the state transition information provided by the RAM or ROM component 402. For example, a state fetch component 502, a decoder component 504, and a process and store component 506 may be operated essentially as a three stage pipeline processor that is configured to emulate a hardware FSM. Additional details on the configuration of the process and store component 506 are provided below. A control component 508 may also be implemented to control the stages of the pipeline processor using a virtual FSM controller 524 in conjunction with status 510 and control 512 registers. The connections from the control component 508 to other portions of the processor component are not shown for ease of illustration.

As further shown in FIG. 5, the state fetch component 502 may be configured to load the state transition information from the RAM or ROM 402.

The decoder component 504 may be configured to decode the state transition information provided by the state fetch component 502 and to provide the decided state transition information, or process control data, to the process and store component 506 via path 522. The decoder component 504 may also be configured to increment the state counter 518 and controlling the read port of the interface to the RAM block 404 and register block (REG) 408.

The processor component 500 may also include additional register components 514/516 to manage information within the processor. A state counter register 518 may be included to address the state transition information being processed by the processor 500. Additionally, if the state transition information has a variable byte length it may overlap one ROM/RAM line to the following one. Therefore, in the event of overlap, it may be required to store the ROM/RAM line into the fetch cache register 520 to make it available for the next state. Also, registers 516 may be used to store temporal data that is related to the processing of the state transition information in the process and store component 506.

Figure 6:
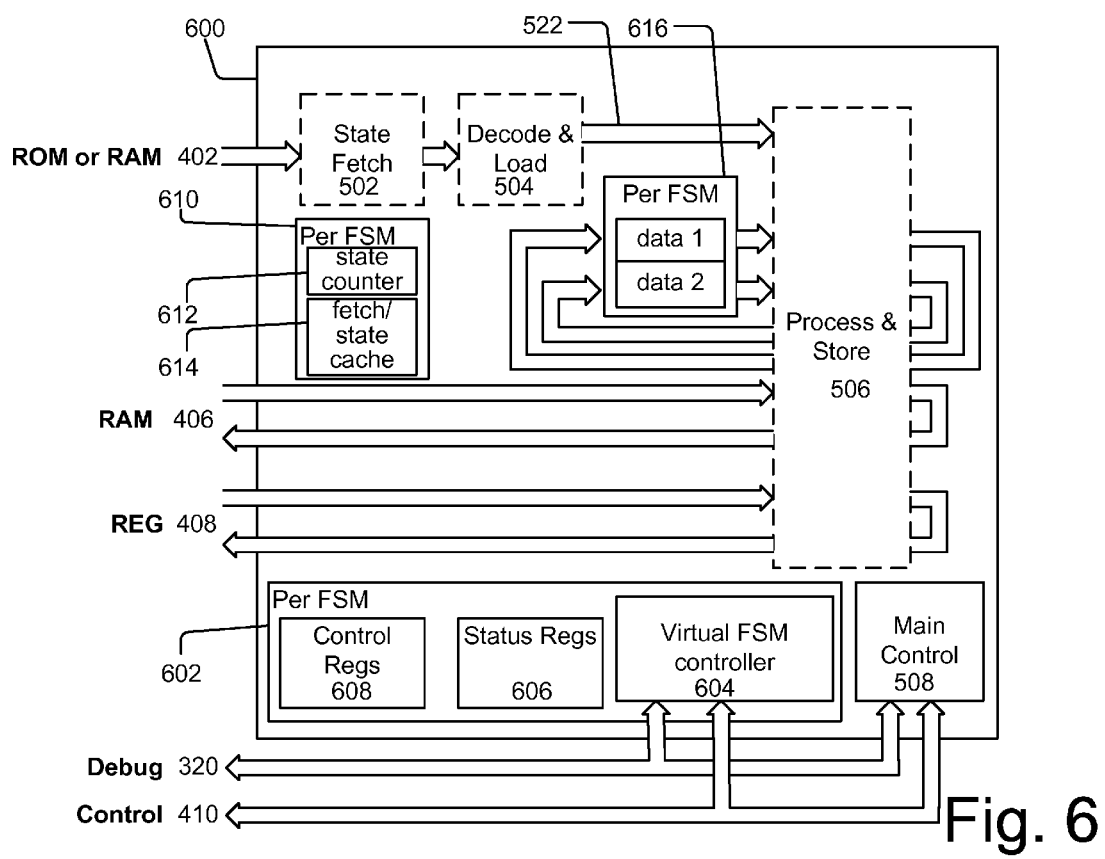
FIG. 6 is an exemplary embodiment of a processor in accordance with the present disclosure.

FIG. 6 illustrates an embodiment in which the processor component 600 may include a pipeline processor configuration to receive and execute a plurality of state transition information in order to emulate a plurality of hardware FSMs. In this configuration, multiple hardware FSMs may be emulated by a processor component 600. In one embodiment, each emulated hardware FSM, also characterized as virtual FSM, may require its own working registers. Hence, for each virtual FSM the processor component 600 may have its own control component 602 that includes a virtual FSM controller 604 along with dedicated status register 606 and control registers 608. FIG. 6 denotes this preference by designating those components as "Per FSM." Accordingly, each control component 602 will also provide and receive control information via the control signals 410. The control signals 410 may include the global time signal 310, the time accurate strobe signal 312, and other signals from the signaling bus 308. Each control component 602 is also configured to be debugged, via path 320, by the Multi-Core Debug System 216 as shown in FIG. 2. Each virtual FSM may also have dedicated registers 610 and 616 that may include a state counter 612, a fetch/state cache 614, and additional data registers to store temporal data that is related to the processing of the state transition information in the process and store component 506.

As further shown in FIG. 6, the main control component 508 may also be implemented to control the stages of the pipeline processor and the sequencing of the virtual FSMs through the pipeline processor, that may include a state fetch component 502, a decoder component 504, and a process and store component 506.

Figure 7:
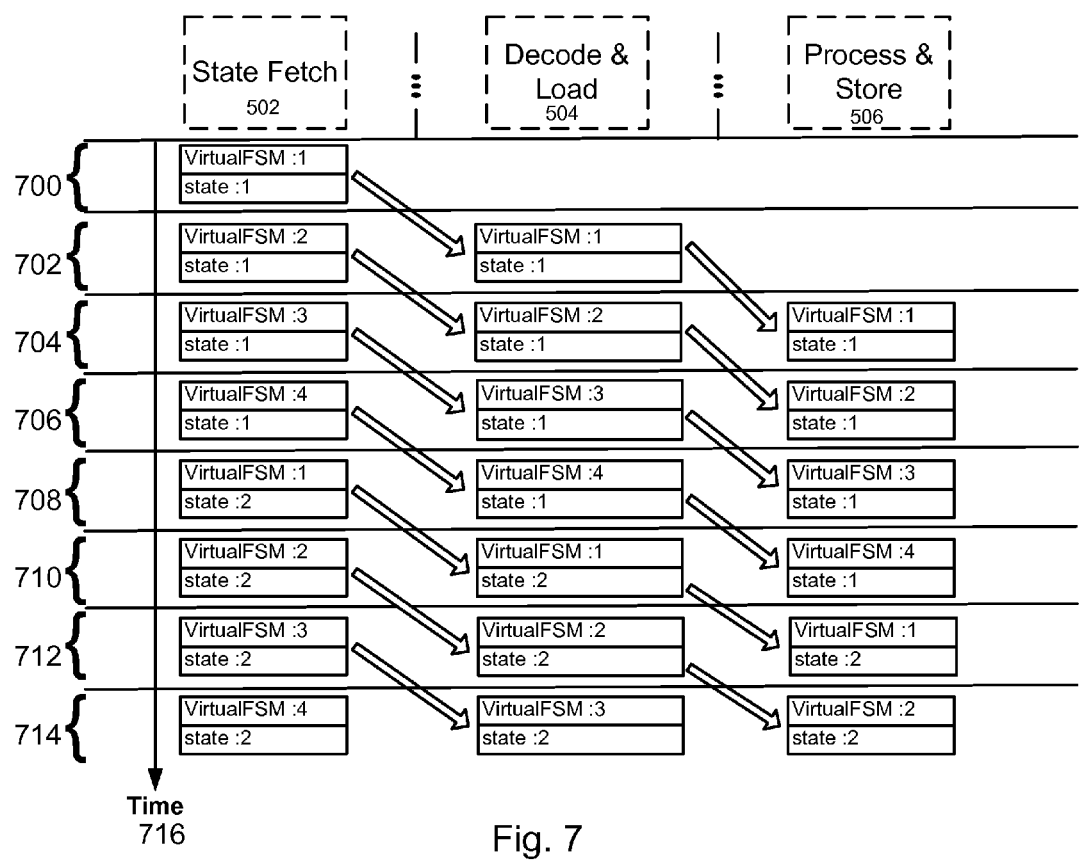
FIG. 7 shows an exemplary embodiment of a multithreading technique as implemented in accordance with the present disclosure.

FIG. 7 illustrates an embodiment, in which the scheduling and execution of a plurality of threads, each representing a virtual FSM, through the pipeline processor may occur in a fixed order such that each stage of the pipeline processor produces an output for a specific thread on a fixed time grid, resulting in a cycle accurate and deterministic thread processing regime. The fixed order, or ordered simultaneous multithreading, not only allows cycle accurate thread processing, but also avoids data hazards and pipeline stalls due to conditional branch operations. This is due to the fact that there are several clock cycles between two subsequent operations of a thread which are filled by processing operations of other threads. Also, each stage of the pipeline processor simultaneously processes a thread during each clock cycle.

For example, as shown in FIG. 7, a three stage pipeline processor represented by the column headers of the state fetch stage 502, the decode and load stage 504, and the process and store stage 506 will process states from four virtual FSMs in a fixed order. The individual rows along the time axis 716 are representative of a clock cycle, such that each stage may output a state for each clock cycle. After the first clock cycle 700, the first stage outputs the first state from the first virtual FSM. During the second clock cycle 702, the second stage outputs the first state from the first virtual FSM and the first stage output the first state from the second virtual FSM. During the third clock cycle 704, the third stage outputs the first state from the first virtual FSM, the second stage output the first state from the second virtual FSM, and the first stage outputs the first state from the third virtual FSM. During the fourth clock cycle 706, the third stage outputs the first state from the second virtual FSM, the second stage outputs the first state from the third virtual FSM, and the first stage outputs the first state from the fourth virtual FSM. Accordingly, this process would repeat based on the total number of virtual FSMs that are available. Only four are shown here for exemplary purposes, in practice there may be greater or fewer virtual FSMs available. The fixed order processing would repeat during additional clock cycles, such as 708, 710, 712, and 714 such that a second state from each of the virtual FSMs would be processed in the same fixed order.

It should be noted, if there is a state from a virtual FSM that is not available to be processed the fixed order does not change, such that the pipeline processor will not process another available state out of order even if the expected state is not present.

Figure 8:
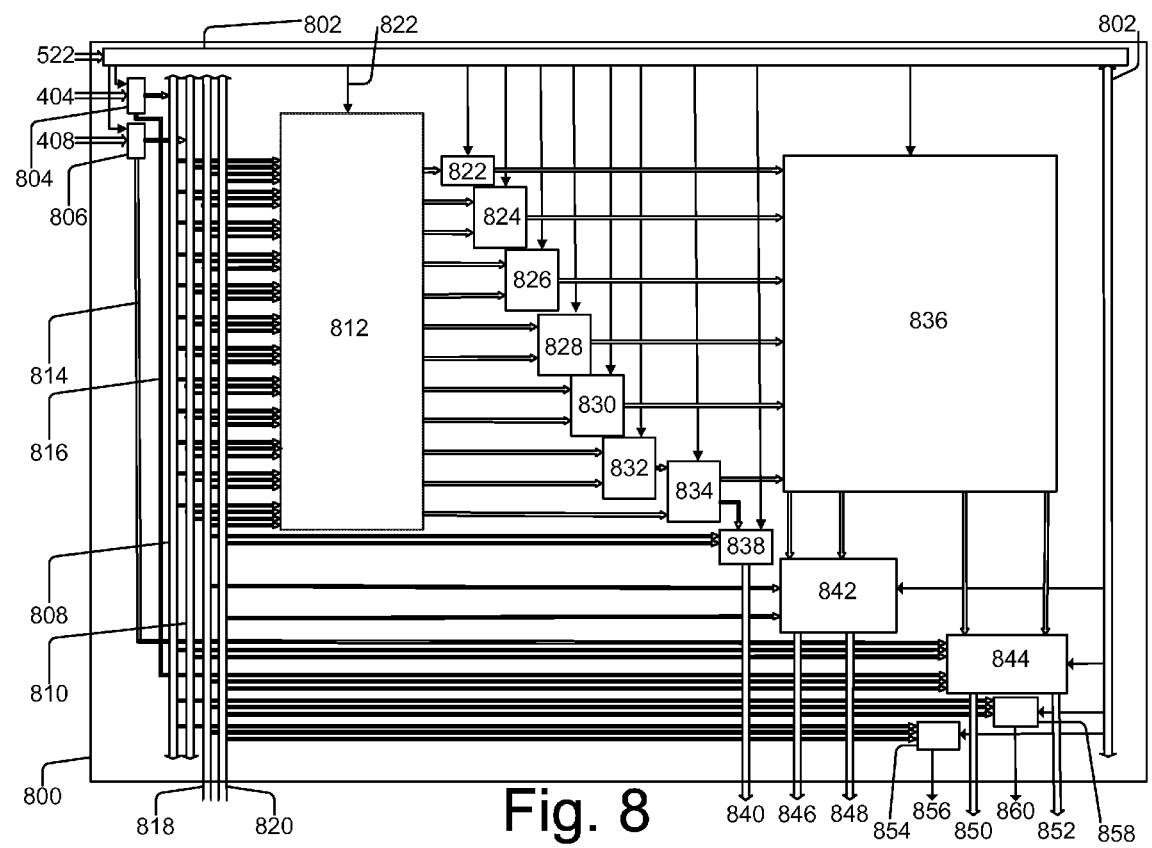
FIG. 8 is a process flow diagram implementing a method described in the present disclosure.

FIG. 8 is an illustration of the details of the process and store component 506. The process and store component 800 is configured to receive the process control data 522 from the decoder component 504, as well as the RAM data 404 and register data 408 and 516.

The process control data 522 is instrumental in controlling the operations of the process and store component 800 and includes the state transition information that configures the processor and store component 800 to emulate a plurality of finite state machines.

In one embodiment, the process control data bus 802 interfaces with every component in the process and store component 800 dictating which components are used to process the data from the RAM 404, state counter 518, and registers 408, and 516. The data from the RAM 404 and registers 408 are each provided to mask and shift components 804 and 806, respectively, which are used to extract bit fields from the data that will be provided, via paths 808 or 810, to the multiplexer block 812. The un-extracted data is provided to paths 814 and 816 that will be later recombined with the extracted data. At multiplexer block 812, the extracted data, from paths 808 or 810, may be multiplexed with additional data from register 516 provided from paths 818 and 820. The multiplexer block represents a plurality of multiplexers (not shown), illustrated here as a single block 812. Each output of multiplexer block 812 indicates at least one multiplexer that is included in block 812. Similarly, the groupings of three or four input signals to block 812 are representative of the inputs for each multiplexer. It should be noted that the process control data bus 802 is connected to each individual multiplexer and may control or enable the individual multiplexers and to provide immediate data, such as constant values to the logical and arithmetic blocks. The plurality of outputs from the multiplexer blocks are provided to a plurality of logical or arithmetic blocks which are controlled by process control data 522 via process control data bus 802. The process control data bus 802 will provide signals to individual logic and arithmetic blocks that will enable them to function in a desired configuration in order to process the extracted data provided by the multiplexer block 812. The desired configuration may change with every clock cycle depending on the data that needs to be processed. In one embodiment, the logic and arithmetic blocks may include a shift component 822, a first bit logic component 824, a first add/subtract 826, a second add/subtract component 828, a multiplying component 830, a compare component 832, and a second bit logic component 834. The bit logic components may perform various logical functions such as "or", "and", "xor", and "not". It should be noted many different configurations of logic and arithmetic blocks are possible, the embodiment described above (822-834) is just one example. The parallel configuration of the logic and arithmetic blocks (822-834) with the multiplexing block 812 and the process control data bus 802 enables each logic and arithmetic block to be selectively used for processing the extracted data provided from the multiplexer block 812. For example, during the first clock cycle the first bit logic component 824, the first add/subtract component 826, and the compare component may be utilized. During the second clock cycle a different variation of logic and arithmetic components may be used. Yet again, another variation of the logic and arithmetic components may be used during the third clock cycle.

Following the processing in the logic and arithmetic blocks, the extracted data is out to a demultiplexer block 836 and decider block 838. The decider block 838 is configured to provide state count information that is provided to the state register 518, via path 840. The demultiplexer block 836 includes a plurality of demultiplexers that route processed data to various shift and combine components 842 and 844. The demultiplexer block 836 provides the processed data to specific shift and combine components, either 842 or 844. The specific shift and combine component will be selected based on which RAM 404 or registers (408 or 516) the processed data will need to be saved. The shift and combine components, 842 and 844, will combine the processed data with the unextracted data provided from paths 814, 816, 818, or 820. The recombined data from shift and combine component 842 will be provided to register 516 via paths 846 and 848. The recombined data from the shift and combine 844 will be provided to the RAM 406, via path 850, and register 408, via path 852. The address information for the RAM 406 data may be provided by the first address selection component 854 via path 856. The address information for the register 408 data may be provided the second address component 858 via path 860.

Exemplary Method

Specifics of exemplary methods are described below. However, it should be understood that certain acts need not be performed in the order described, and may be modified, and/or may be omitted entirely, depending on the circumstances.

Figure 9:
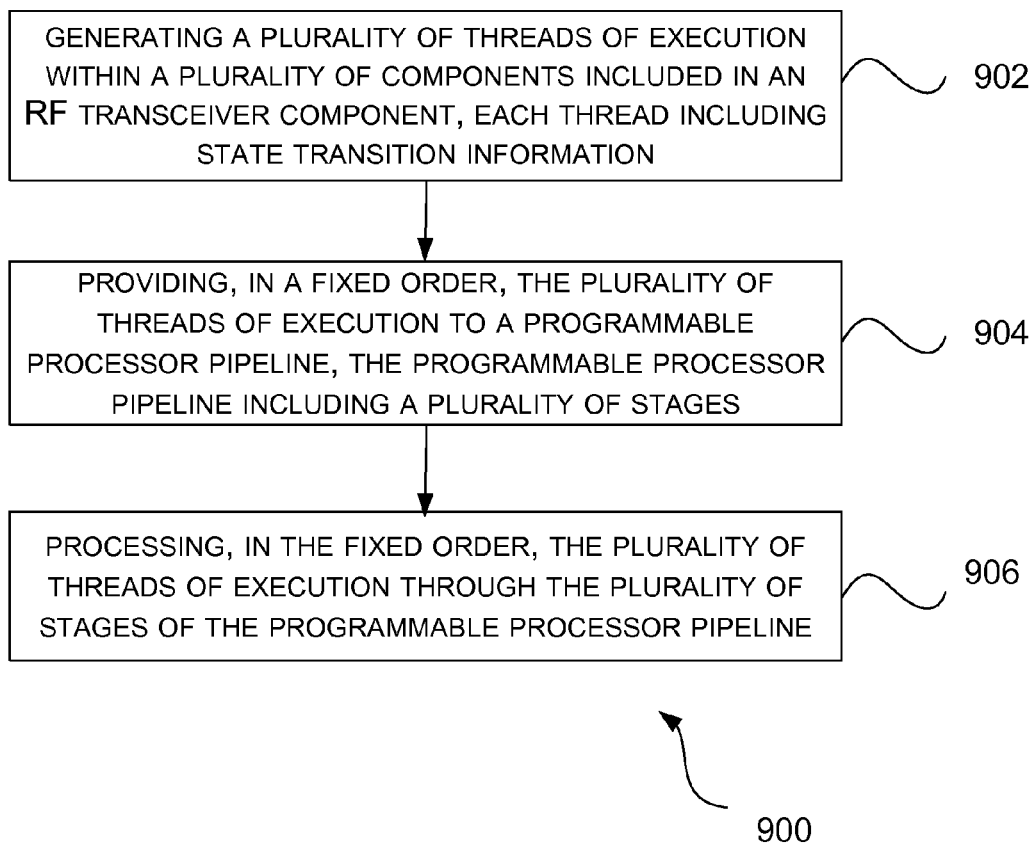
FIG. 9 is an exemplary embodiment of a pipeline processing stage as implemented in accordance with the present disclosure.

FIG. 9 illustrates an exemplary method 900 for simultaneously processing a plurality of threads, each representing a virtual FSM, in a fixed order through the stages of the pipeline processor.

At 902, a plurality of threads are generated within a plurality of components included in an RF transceiver, wherein each thread includes state transition information. The RF transceiver may include a plurality of unit controllers, such as 134, that may include a plurality of control components 602 that will share a process and store component 506 that executes state transition information from related threads.

At 904, provide the plurality of threads, in a fixed order, to a processor pipeline, such as the three stage pipeline processor that includes a plurality of stages. For example, a programmable processor pipeline may include a state fetch component 502, a decoder component 506, and a process and store component 506. However, the processor pipeline may include greater or fewer number of stages. The fixed order may include the embodiment described in FIG. 7.

At 906, the plurality of threads are processed in a fixed order through the plurality of stages of the programmable processor pipeline. For example, each state progresses to the next stage of the pipeline after each clock cycle and each state, within each stage, is processed simultaneously with each clock cycle. As noted above in FIG. 7, the processing of the virtual FSMs will repeat when at least one state from each of the virtual FSMs in the unit controller have been given the opportunity to be processed through the pipeline. For example, after the first clock cycle 700, the first stage outputs the first state from first virtual FSM. During the second clock cycle 702, the second stage outputs the first state from the first virtual FSM and the first stage output the first state from the second virtual FSM. During the third clock cycle 704, the third stage outputs the first state from the first virtual FSM, the second stage output the first state from the second virtual FSM, and the first stage outputs the first state from the third virtual FSM. During the fourth clock cycle 706, the third stage outputs the first state from the second virtual FSM, the second stage outputs the first state from the third virtual FSM, and the first stage outputs the first state from the fourth virtual FSM. Accordingly, this process would repeat based on the total number of virtual FSMs that are available. Only four are shown here for exemplary purposes, in practice there may be greater or fewer virtual FSMs available. The fixed order processing would repeat during additional clock cycles, such as 708, 710, 712, and 714 such that a second state from each of the virtual FSMs would be processed in the same fixed order.

Figure 10:
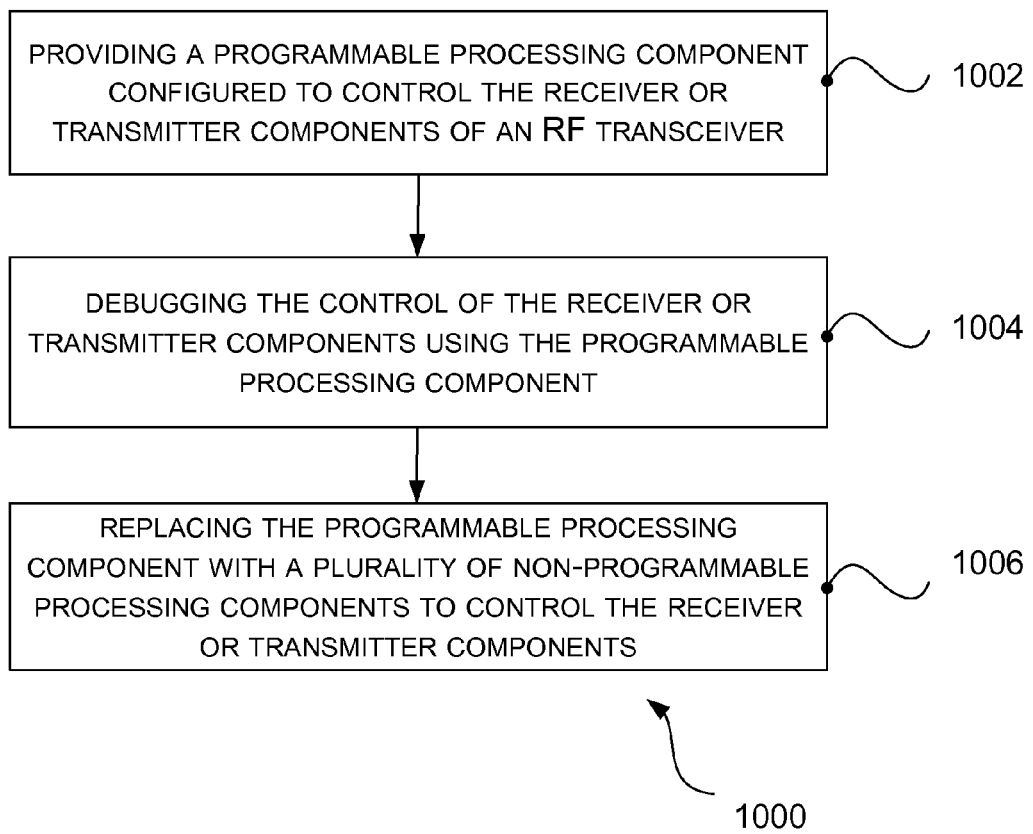
FIG. 10 is a process flow diagram implementing a method described in the present disclosure.

FIG. 10 illustrates an exemplary method for designing a transceiver is presented in accordance with the present disclosure. The method is intended to reduce the risk of additional tape-outs for new transceiver designs due to bugs or control problems related to a hardwired logic design.

At 1002, a processor may be configured to control the receiver or transmitter components of a first RF transceiver, instead of a hardwired logic design. The processor 400 is configurable based on software commands or state transition information it receives and may emulate the performance of a plurality of finite state machines.

At 1004, the control functions of the receiver and transmitter components maybe developed and debugged using a Multi-Core Debugging System 216. The control functions may be represented by the state transition information which may be loaded into the RAM 402 such that it may be executed by the processor component 400. When an unwanted behavior is detected during the execution of the state transition information the Multi-Core Debugging System 216 may be used to detect the source of the error or unwanted behavior. The error may be corrected by loading updated state transition information into the RAM 402. Accordingly, as control issues are identified during the development process, the processor 400 can be reconfigured using the updated state transition information in order to account for or correct the control issues without taping out and manufacturing another transceiver design.

At 1006, the processor 400 in the first RF transceiver can be replaced with a plurality of logic devices, such as finite state machines. The finite state machines are unable to be configured by software. The replacement of the processor may include designing and manufacturing a second RF transceiver that includes the plurality of processing components that are unable to be configured by software and that will represent the functions of the processor 400 used in step 1002.

CONCLUSION

For the purposes of this disclosure and the claims that follow, the terms "coupled" and "connected" have been used to describe how various elements interface. Such described interfacing of various elements may be either direct or indirect. Although the subject matter has been described in language specific to structural features and/or methodological acts, it is to be understood that the subject matter defined in the appended claims is not necessarily limited to the specific features or acts described. Rather, the specific features and acts are disclosed as preferred forms of implementing the claims.

The invention claimed is:

1. A transceiver comprising:
   a plurality of independently controlled components, each independently controlled component including a programmable digital portion;
   a unit controller in the programmable digital portion of each independently controlled component, each unit controller associated with each of the plurality of independently controlled components including a programmable processor component configured to receive and to execute state transition information;
   an interface component including a baseband interface configured to couple to a baseband processor; and
   a bus and distribution system comprising a plurality of dedicated bus systems to allow the independently controlled components to operate more efficiently than over a single bus, the plurality of dedicated bus systems including:
     a time accurate strobe distribution system configured to provide command instructions to each of the unit controllers and a central processing sub-system; and
     a global time distribution system, distinct from the time accurate strobe distribution system, configured to provide a timing signal to the central processing sub-system and each unit controller, the timing signal synchronizes the central processing sub-system and each unit controller.

2. The transceiver of claim 1, wherein the bus and distribution system further comprises: a signaling bus system configured to provide and to receive event notifications from each unit controller and the central processing sub-system, the event notifications indicating when the unit controller or central processing sub-system should perform a task.

3. The transceiver of claim 1, wherein the bus and distribution system is configured to provide configuration information from the central processing sub-system to a plurality of unit controllers of the plurality of independently controlled components; and
   wherein the transceiver includes a logic interface component configured to provide configuration information to the plurality of unit controllers over the bus and distribution system.

4. The transceiver of claim 3, wherein the central processing sub-system is configured to receive configuration macros, to decode the configuration macros, and to provide configuration information to each unit controller based on the configuration macros.

5. The transceiver of claim 1, further comprising: a multi-core debug system connected to a debug bus system configured to provide debug instructions to each unit controller and the central processing sub-system and to receive debug results from each unit controller and the central processing sub-system.

6. The transceiver of claim 1, wherein each unit controller is configured to control a analog portion and a digital portion within a respective independently controlled component.

7. The transceiver of claim 1, wherein each independently controlled component is independently controlled by its respective unit controller.

8. The transceiver of claim 1, wherein the interface component of the transceiver includes the central processing sub-system.

9. The transceiver of claim 1, wherein a first independently controlled component of the plurality of independently controlled components includes the interface component.

10. The transceiver of claim 1, wherein one or more unit controllers of the plurality of independently controlled components includes a pipeline processor.

11. The transceiver of claim 10, wherein the pipeline processor is a multi-stage pipeline processor configured to emulate a plurality of finite state machines.

12. The transceiver of claim 10, wherein the pipeline processor includes multiple parallel data paths that are reconfigurable with each clock cycle of the pipeline processor.

13. The transceiver of claim 10, wherein the pipeline processor is configured to receive a plurality of threads, each thread including state transition information, and to process, in a fixed order, the plurality of threads.

\* \* \* \* \*